(12) United States Patent
Hashimoto

(10) Patent No.: US 8,364,351 B2
(45) Date of Patent: Jan. 29, 2013

(54) OCCUPANT PROTECTION DEVICE

(75) Inventor: Syuzo Hashimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 225 days.

(21) Appl. No.: 12/996,442

(22) PCT Filed: Jun. 8, 2009

(86) PCT No.: PCT/IB2009/005880
§ 371 (c)(1),
(2), (4) Date: Dec. 6, 2010

(87) PCT Pub. No.: WO2009/150511
PCT Pub. Date: Dec. 17, 2009

(65) Prior Publication Data
US 2011/0074190 A1 Mar. 31, 2011

(30) Foreign Application Priority Data
Jun. 9, 2008 (JP) .................................. 2008-150380

(51) Int. Cl.
*B60R 22/00* (2006.01)
(52) U.S. Cl. ........ 701/45; 701/301; 180/271; 297/216.1
(58) Field of Classification Search .................... 701/45, 701/301; 180/271; 280/734; 340/436; 297/216.1
See application file for complete search history.

(56) References Cited

U.S. PATENT DOCUMENTS

| | | | |
|---|---|---|---|
| 6,463,372 B1* | 10/2002 | Yokota et al. | 701/45 |
| 6,560,520 B2* | 5/2003 | Yokota et al. | 701/45 |
| 6,574,540 B2* | 6/2003 | Yokota et al. | 701/45 |
| 6,666,292 B2 | 12/2003 | Takagi et al. | |
| 7,031,814 B2* | 4/2006 | Kawato et al. | 701/45 |
| 7,200,474 B2* | 4/2007 | Motozawa et al. | 701/45 |
| 8,157,045 B2* | 4/2012 | Hashimoto et al. | 180/268 |
| 8,190,333 B2* | 5/2012 | Hashimoto et al. | 701/49 |
| 2002/0177934 A1* | 11/2002 | Yokota et al. | 701/45 |

(Continued)

FOREIGN PATENT DOCUMENTS

| EP | 1 591 308 A1 | 11/2005 |
|---|---|---|
| JP | 11-334437 | 12/1999 |

(Continued)

OTHER PUBLICATIONS

International Search Report in International Application No. PCT/IB2009/005880; Mailing Date: Jun. 1, 2010.

(Continued)

*Primary Examiner* — Helal A Algahaim
(74) *Attorney, Agent, or Firm* — Finnegan, Henderson, Farabow, Garrett & Dunner, LLP

(57) ABSTRACT

An occupant protection device includes: a collision prediction part; a seatback actuator that adjusts a reclining angle; a seatbelt retracting part; a reclining angle sensor; and a controller that sets the reclining angle to a target angle and that controls the seatbelt retracting part so that the seatbelt is retracted when the collision prediction part determines that a collision will occur. Accordingly, the controller executes a control so that the driving force of seatbelt retracting part when the reclining angle is decreased is smaller than at least one of the driving force of seatbelt retracting part when the reclining angle is not changed or when the driving force of seatbelt retracting part when the reclining angle is increased.

10 Claims, 8 Drawing Sheets

U.S. PATENT DOCUMENTS

| | | | |
|---|---|---|---|
| 2002/0188393 A1* | 12/2002 | Yokota et al. | 701/45 |
| 2005/0131606 A1* | 6/2005 | Motozawa et al. | 701/45 |
| 2005/0240329 A1 | 10/2005 | Hirota | |
| 2005/0283292 A1* | 12/2005 | Kawato et al. | 701/45 |
| 2010/0280718 A1* | 11/2010 | Hashimoto et al. | 701/45 |
| 2012/0032482 A1* | 2/2012 | Hashimoto et al. | 297/216.13 |

FOREIGN PATENT DOCUMENTS

| | | |
|---|---|---|
| JP | 2001-322532 | 11/2001 |
| JP | 2003-165406 | 6/2003 |
| JP | 2005-238934 | 9/2005 |
| JP | 2005-306340 | 11/2005 |
| JP | 2006-82703 | 3/2006 |
| JP | 2007-106355 | 4/2007 |
| WO | WO 01/45985 A1 | 6/2001 |
| WO | WO 2006/134417 A1 | 12/2006 |

OTHER PUBLICATIONS

Written Opinion of the International Searching Authority in International Application No. PCT/IB2009/005880; Mailing Date: Jun. 1, 2010.

Notification of Reason(s) for Refusal in JP 2008-150380; Drafting Date: Apr. 27, 2010.

\* cited by examiner

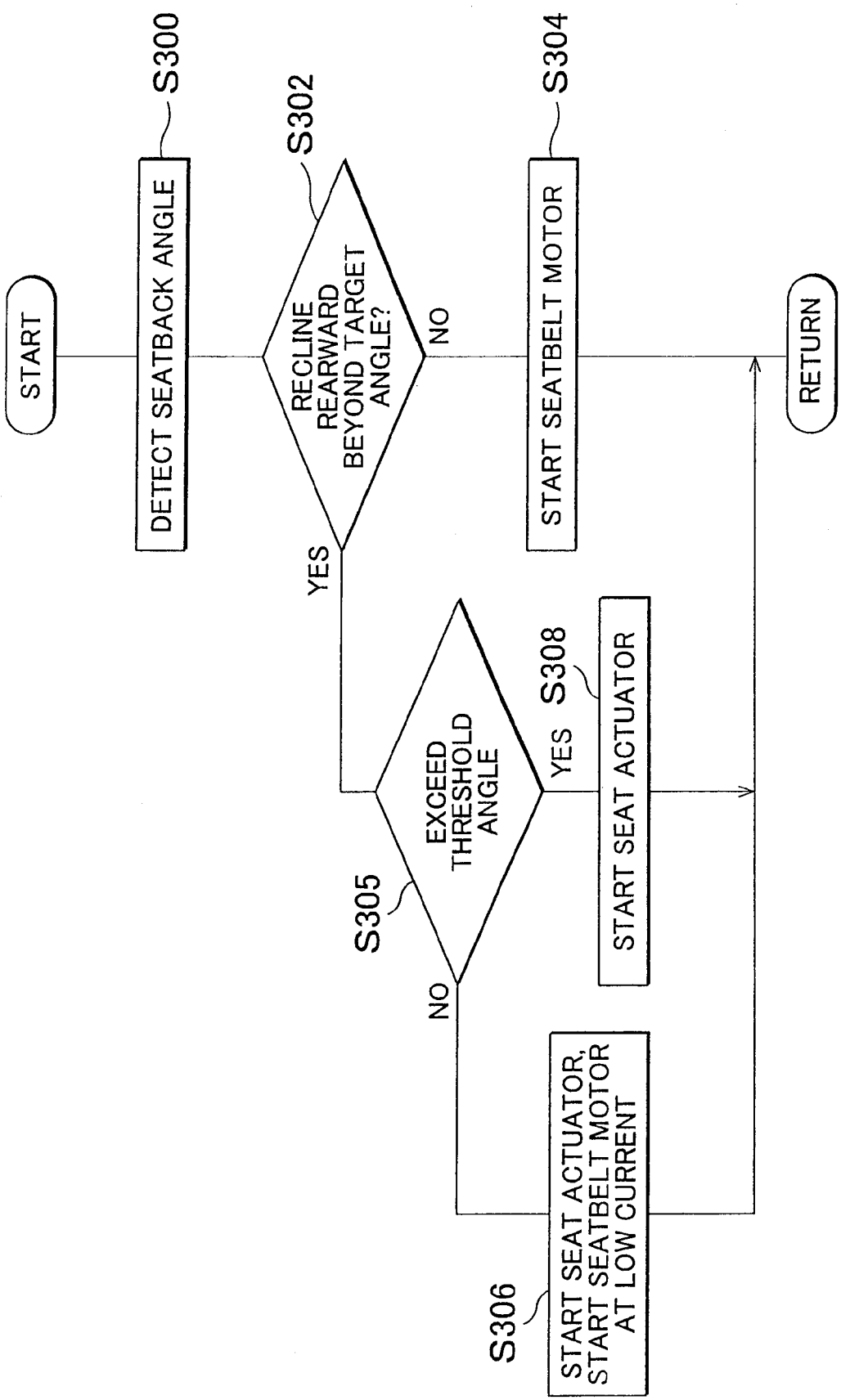

OCCUPANT PROTECTION DEVICE

CROSS-REFERENCE TO RELATED APPLICATIONS

This application is a national phase application of International Application No. PCT/IB2009/005880, filed Jun. 8, 2009, and claims the priority of Japanese Application No. 2008-150380, filed Jun. 9, 2008, the contents of both of which are incorporated herein by reference.

BACKGROUND OF THE INVENTION

1. Field of the Invention

The present invention relates to an occupant protection device, and particularly to an occupant protection device that predicts a collision to protect an occupant.

2. Description of the Related Art

Various arts are proposed as an occupant protection device that protects an occupant in the event of a collision. For example, related arts include: occupant protection devices that protect an occupant by suitably adjusting the posture of an occupant by tilting a seatback forward if the seatback is reclined in an collision prediction state; and an occupant protection device that protects an occupant by retracting a seatbelt in an collision prediction state.

The occupant protection device of this type has been described in Japanese Patent Application Publication No. 11-334437 (JP-A-11-334437), for example. In the art disclosed in JP-A-11-334437, the occupant protection device determines that a collision is imminent, and inclines the seatback forward to a prescribed position if the seatback is reclined beyond a prescribed range, and then retracts a seatbelt by operating a pre-tensioner.

However, in the art disclosed in JP-A-11-334437, the seatbelt is retracted after the operation of the seatback. Preferably, for a quicker operation of occupant protection, the inclination of the seatback and the retraction of the seatbelt are performed simultaneously. In the above art, electric power needed to operate the operation of the occupant protection devices increase. Therefore, control on the occupant protection device has room for improvement.

SUMMARY OF THE INVENTION

The present invention provides an occupant protection device that inclines the seatback of a vehicle seat and retracts a seatbelt with suppressing power consumption.

The occupant protection device according to an aspect of the present invention includes: a collision prediction part that predicts whether a collision will occur for a host vehicle; a seatback actuator that adjusts a reclining angle of the seatback that is defined as a angle between the seatback and a seat cushion; a seatbelt retracting part that exerts a driving force to retract a seatbelt to restrain the occupant; a reclining angle sensor that detects the reclining angle; and a controller that controls the seatback actuator so that the reclining angle becomes a target angle and that controls the seatbelt retracting part to retract the seatbelt, if the it is determined that the collision will occur. The controller executes a control, so that the driving force of the seatbelt retracting part when the reclining angle of the seatback is decreased is smaller than at least one of the driving force of the seatbelt retracting part in retracting the seatbelt when the reclining angle of the seatback is not changed and the driving force of the seatbelt retracting part when the reclining angle of the seatback is increased.

According to the above aspect, the collision prediction part predicts a collision will occur for the host vehicle. For example, the prediction of a collision of the host vehicle is made possible by detection of a distance between the host vehicle and the object and by calculation of an estimated time of impact between the host vehicle and the object.

A reclining angle of the seatback that is a angle between the seatback and the seat cushion is changed by the drive of the seatback actuator, and the seatbelt that restrains the occupant is retracted by the drive of the seatbelt retracting part. The reclining angle of the seatback is detected by the reclining angle sensor.

When a collision is predicted by the collision prediction part, the controller controls the seatback actuator to change the reclining angle of the seatback to become the target angle, and also controls the seatbelt retracting part to retract the seatbelt. That is, the reclining angle of the seatback can suitably be adjusted, and restraining strength of the seatbelt can suitably be adjusted. Thus the occupant can be protected in the collision.

When the collision is predicted, the controller executes the control, so that the driving force of the seatbelt retracting part when the reclining angle of the seatback is decreased is smaller than at least one of the driving force of the seatbelt retracting part in retracting the seatbelt when the reclining angle of the seatback is not changed and the driving force of the seatbelt retracting part when the reclining angle of the seatback is increased. That is, when the operation of inclining the seatback frontward and the operation of retracting the seatbelt are performed at the same time upon the prediction of a collision, the occupant is restrained by both of these operations at the same time. For this reason, an appropriate restraining force of the seatbelt can easily be achieved when an occupant is restrained by the seatbelt. Thus, driving force in retracting the seatbelt is reduced. Reduction of the driving force of the seatbelt retracting part in the manner described above enables the seatbelt retracting part to reduce its power consumption. Thus, the inclining operation of the seatback and the retraction of the seatbelt are suitably performed, and the power consumption is suppressed.

In the above aspect, the seatbelt retracting part may include a motor, and the controller may reduce the driving force of the seatbelt retracting part by reducing an electric current supplied to the motor.

In the above aspect, the controller may prohibit the seatbelt retracting part from retracting the seatbelt if the reclining angle is equal to or exceeds a threshold reclining angle. That is, if the seatback is reclined rearward at the threshold reclining angle or more, posture of the occupant can suitably be adjusted, and the operating electric power of the seatback actuator is sufficiently maintained, by prohibiting the retraction of the seatbelt.

As described above, according to an aspect of the present invention, if the seatback is inclined to the target reclining angle and the seatbelt is retracted in the collision prediction state, the controller executes the control, so that the driving force in retracting the seatbelt when the reclining angle of the seatback is decreased is smaller than at least one of the driving force in retracting the seatbelt when the reclining angle of the seatback is not changed and the driving force when the reclining angle of the seatback is increased. Thus, power consumption necessary for retracting the seatbelt can be reduced, so that the inclination of the seatback and the retracting operation of the seatbelt can suitably be performed, and the power consumption is suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 8 is a flow chart that shows a modification of occupant protection operation start process performed in the occupant protection control ECU in one embodiment of the occupant protection device.

DETAILED DESCRIPTION OF EMBODIMENTS

Figure 1:
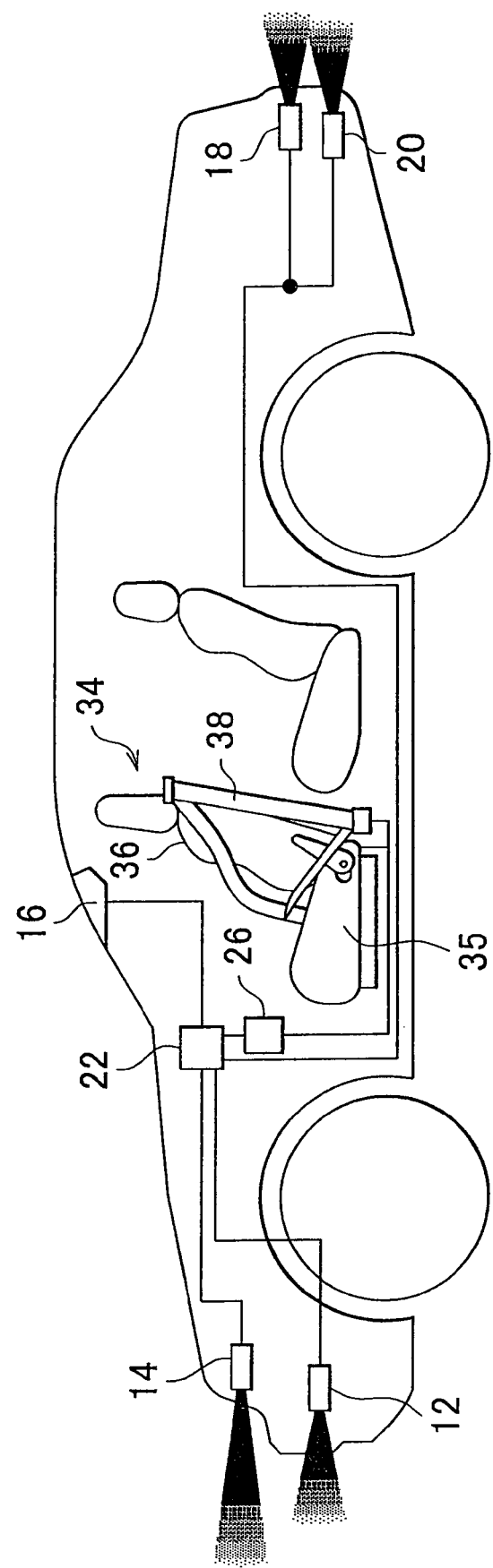
FIG. 1 shows the general arrangement of an occupant protection device in a vehicle according to an aspect of the present invention.

An embodiment of the present invention will be described hereinafter in detail with reference to accompanying drawings. FIG. 1 is a drawing that shows a general arrangement of the occupant protection device in the vehicle according to the embodiment of the present invention, and FIG. 2 is a block diagram that shows the configuration of the occupant protection device according to the embodiment of the present invention.

Figure 2:
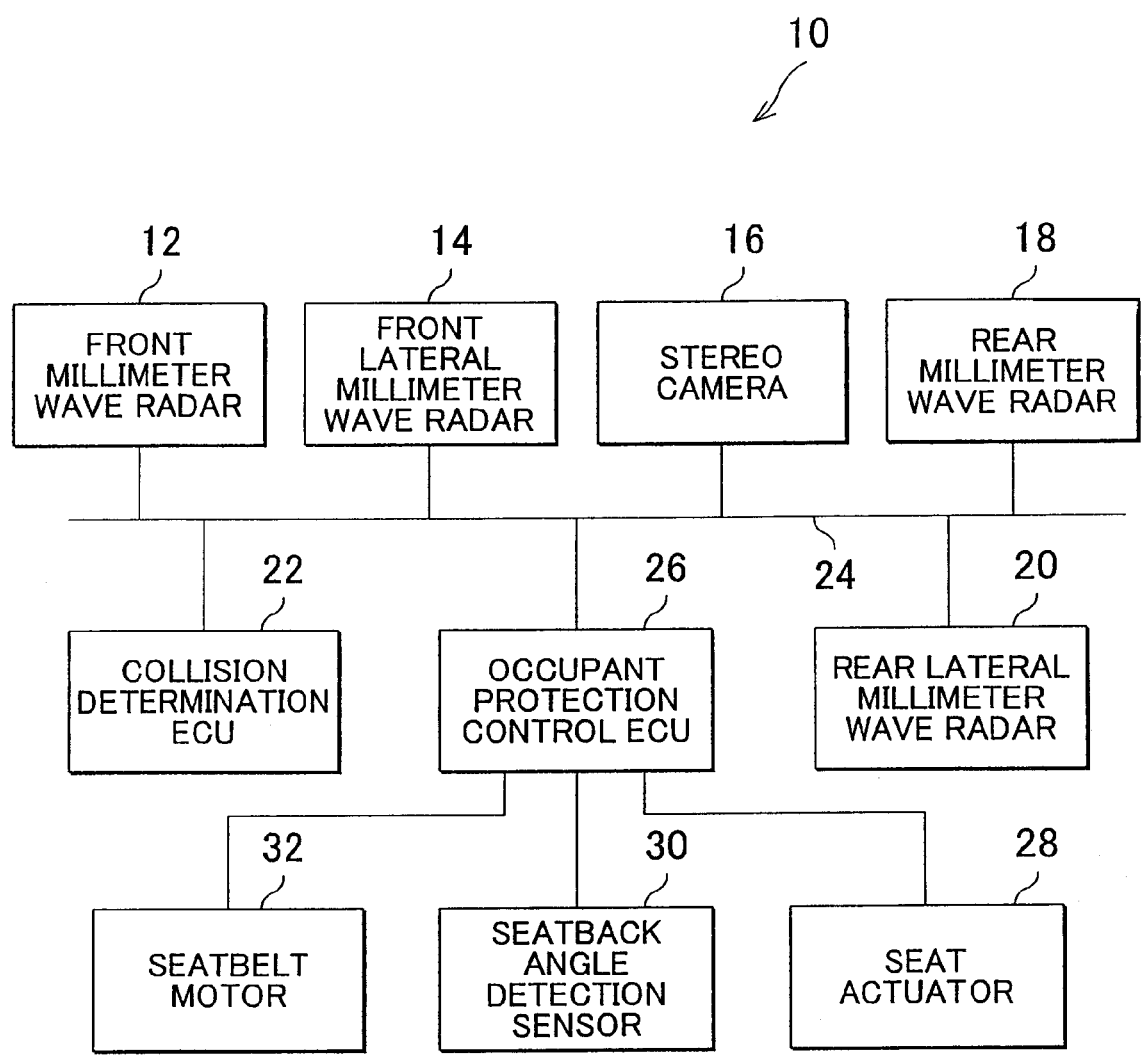
FIG. 2 is a block diagram that shows the configuration of the occupant protection device according to an embodiment of the present invention.

As shown in FIG. 1 and FIG. 2, the occupant protection device 10 includes: a seat 34 that includes a seat cushion 35 and seatback 36; a seatbelt 38, a front millimeter wave radar 12 that detects the distance to objects in front of the host vehicle; a front lateral millimeter wave radar 14 that detects the distance to objects in the lateral front of the host vehicle; a stereo camera 16 that captures an image of the front; a rear millimeter wave radar 18 that detects the distance to objects behind the host vehicle; a rear lateral millimeter wave radar 20 that detects the distance to objects in the lateral rear of the vehicle; and a collision determination ECU (Electronic Control Unit) 22 (collision prediction part). These components are connected to a bus 24. The front millimeter wave radar 12, the front lateral millimeter wave radar 14, the stereo camera 16, the rear millimeter wave radar 18, and the rear lateral millimeter radar 20 monitor the surroundings of the host vehicle and output their results to the collision determination ECU 22.

For example, the front millimeter wave radar 12 may be disposed near the center of the front grille, and the front lateral millimeter wave radar 14 may be disposed near the lateral side ends of a bumper. The front millimeter wave radar 12 and the front lateral millimeter wave radar 14 transmit millimeter waves to the front and the lateral front of the vehicle, respectively, and receive radio waves reflected from any objects present. The front millimeter wave radar 12 and the front lateral millimeter wave radar 14 then calculate the distance to the objects and the speed relative to the host vehicle based on a traveling time of millimeter waves, a frequency difference caused by the Doppler effect, etc. Likewise, the rear millimeter wave radar 18 and the rear lateral millimeter wave radar 20 may be disposed in a rear bumper or the like, and transmit millimeter waves to the rear and the lateral rear of the vehicle and receive radio waves reflected from any objects present, and then calculate the distance to the object and a relative speed of the object based on a traveling time, a frequency difference caused by the Doppler effect, etc.

The stereo camera 16 is disposed near the center in an upper portion of a windshield, and captures an image of the front of the vehicle in order to detect objects around the vehicle and to calculate the distances to the objects. However, the stereo camera 16 may be omitted from the configuration.

The collision determination ECU 22 predicts whether a collision will occur based on obtaining detected values from the front millimeter wave radar 12, the front lateral millimeter radar 14, the stereo camera 16, the rear millimeter wave radar 18, and the rear lateral millimeter radar 20. Various conventional arts can be applied for predicting a collision. Therefore, detailed description of the collision prediction will be omitted.

The occupant protection device 10 according to an embodiment of the present invention is connected to the bus 24 while further including an occupant protection control ECU 26 that controls the state adjustment of the seatback 36 and the retraction of the seatbelt 38 when a collision is predicted by the collision determination ECU 22.

Figure 3:
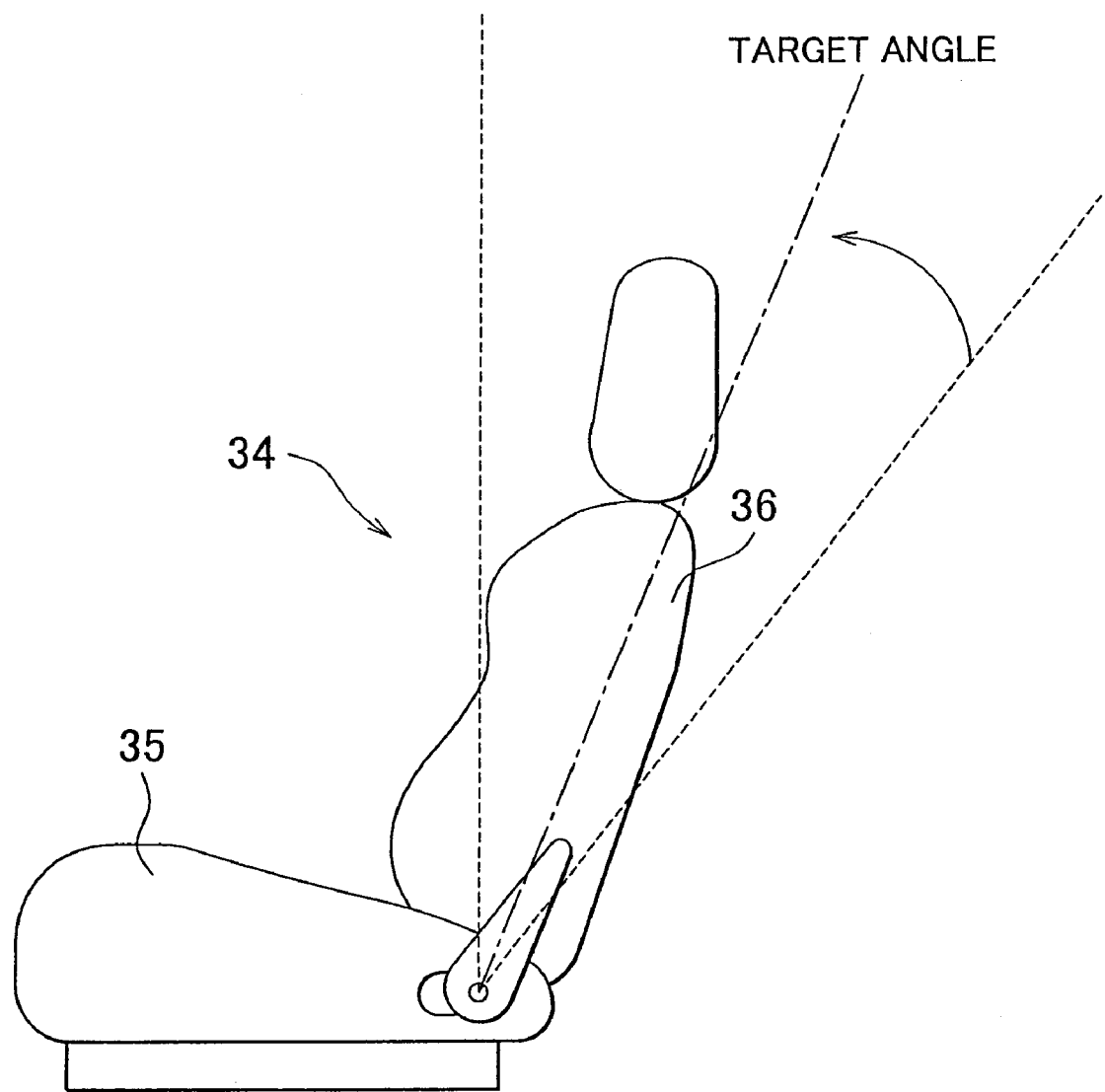
FIG. 3 is a diagram for explaining the adjustment of a seatback when a collision is predicted.

The occupant protection control ECU 26 is connected with a seatback angle detection sensor 30 that detects the reclining angle of the seatback 36 with respect to the seat cushion 35 (an angle between the seatback 36 and the seat cushion 35), and a seat actuator 28 (a seatback actuator that adjusts the reclining angle of the seatback 36. When a the collision determination ECU 22 determines that a collision is imminent, the occupant protection control ECU 26 controls the seat actuator 28 to actuate a seat reclining mechanism (not shown) so that the reclining angle of the seatback 36 with respect to the seat cushion 35 reaches a predetermined target angle as a target reclining angle before the collision occurs, as shown in FIG. 3. The target angle may be a target angle range. That is, the target angle may be a value within a predetermined angle range.

When the collision determination ECU 22 determines that a collision is imminent, the occupant protection control ECU 26 (controller) controls a seatbelt motor 32 (seatbelt retracting part) to retract the seatbelt 38 and thereby restrain the occupant.

Figure 4A:
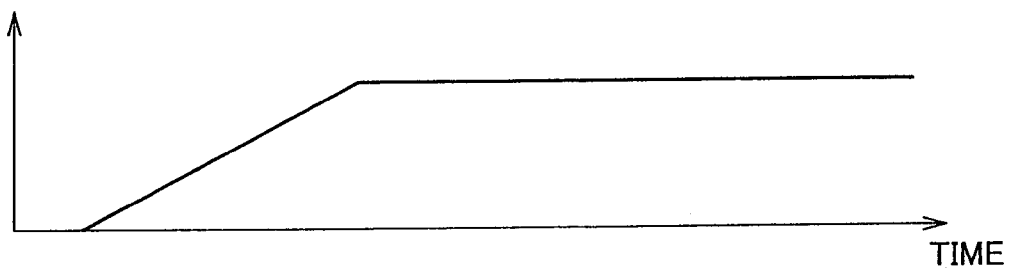
FIG. 4A shows an electric current that is applied to a seat actuator.
Figure 4B:
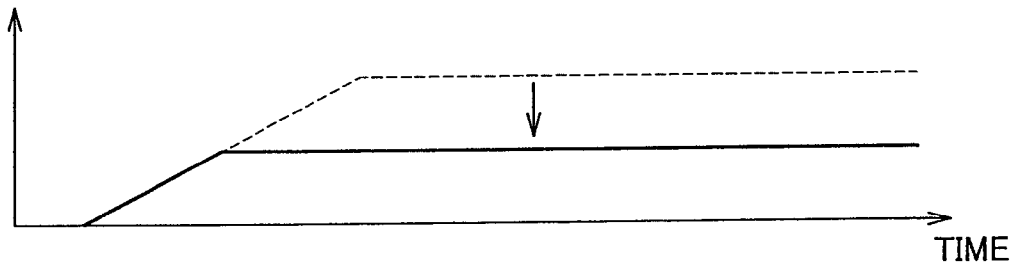
FIG. 4B shows an electric current that is applied to a seatbelt motor when the seatback is reclined rearward beyond a target angle when the collision is predicted.

As shown in FIG. 4A and FIG. 4B, the seat actuator 28 and the seatbelt motor 32 are driven when an electric current is applied to the seat actuator 28 and the seatbelt motor 32.

When a state change of the seat 34 is commanded by a switch or the like (not shown), the states of the seat 34 such as a reclining angle and a seat slide are changed by the seat actuator 28 and another actuator respectively corresponding to the control on the switch.

If the reclining angle of the seatback 36 exceeds the target angle (i.e., the seatback 36 is reclined toward the rear of vehicle beyond the target angle) and it is determined that a collision is imminent, the reclining angle of the seatback 36 is adjusted and the seatbelt 38 is retracted simultaneously by simultaneously driving the seat actuator 28 to incline the seatback 36 and the seatbelt motor 32 to retract the seatbelt 38. Accordingly, the occupant is restrained by both the inclination of the seatback 36 and retraction of the seatbelt 38.

Thus, the appropriate restraining force of the seatbelt 38 may easily be achieved when the occupant is restrained by the seatbelt 38.

Hence in the present embodiment, when the inclination of the seatback 36 and the retraction of the seatbelt 38 are performed simultaneously, the driving force of the seatbelt motor 32 when the reclining angle of the seatback 36 is decreased (i.e., the reclining angle of the seatback 36 is changed to the direction in which the holding force of the seatbelt 38 increases) is set smaller than the driving force of the seatbelt motor 32 when retracting the seatbelt without changing the reclining angle of the seatback 36. Specifically, in the present embodiment, the driving force is reduced by reducing the electric current supplied to the seatbelt motor 32. Accordingly, partial electric power for the seatbelt motor 32 may be supplied as the electric power for the operation of the seat actuator 28. In other words, operation of the seatback 36 and the retracting operation of the seatbelt 38 may be appropriately performed, and the power consumption is reduced.

In the present embodiment, the electric current that is applied to the seatbelt motor 32 is set as a normal electric current value when the collision determination ECU 22 determines that a collision is imminent and the detected reclining angle of the seatback 36 is the target angle. When the detected reclining angle of the seatback 36 is reclined beyond the target angle, the seatbelt motor 32 is driven at an electric current lower than the normal electric current value (i.e., the seatbelt motor 32 is driven at an electric current is lower than the value that is applied when only the seatbelt motor 32 is driven) as indicated by the arrow in FIG. 4B. The magnitude of the reduced electric current is generally set to a current value that the appropriate restraining force of seatbelt 38 is obtained when the occupant is restrained by the seatbelt 38.

In the present embodiment, adjustment of the seatback 36 when it is determined that a collision is imminent will be described based on the premise that the seatback 36 is reclined toward the vehicle rear beyond the target angle. However, the present invention is not limited to this premise. The seatback 36 may be reclined toward the vehicle rear if the reclining angle of the seatback 36 is smaller than the target angle (i.e., when the seatback 36 is inclined toward the vehicle front beyond the target angle). In addition, in the present embodiment, when the reclining angle of the seatback is decreased (when the restraining force of the seatbelt 38 is increased), the driving force of the seatbelt motor 32 is controlled to be smaller than at least one of the driving force of the seatbelt motor 32 when the seatbelt 38 is retracted without changing the reclining angle of the seatback or when the reclining angle of the seatback 36 is increased (when the restraining force of the seatbelt 38 is reduced). Thus, the inclining operation of the seatback and the retraction of the seatbelt may suitably be performed, and the power consumption is suppressed.

Next the process executed in the ECU of the occupant protection device 10 will be described.

Figure 5:
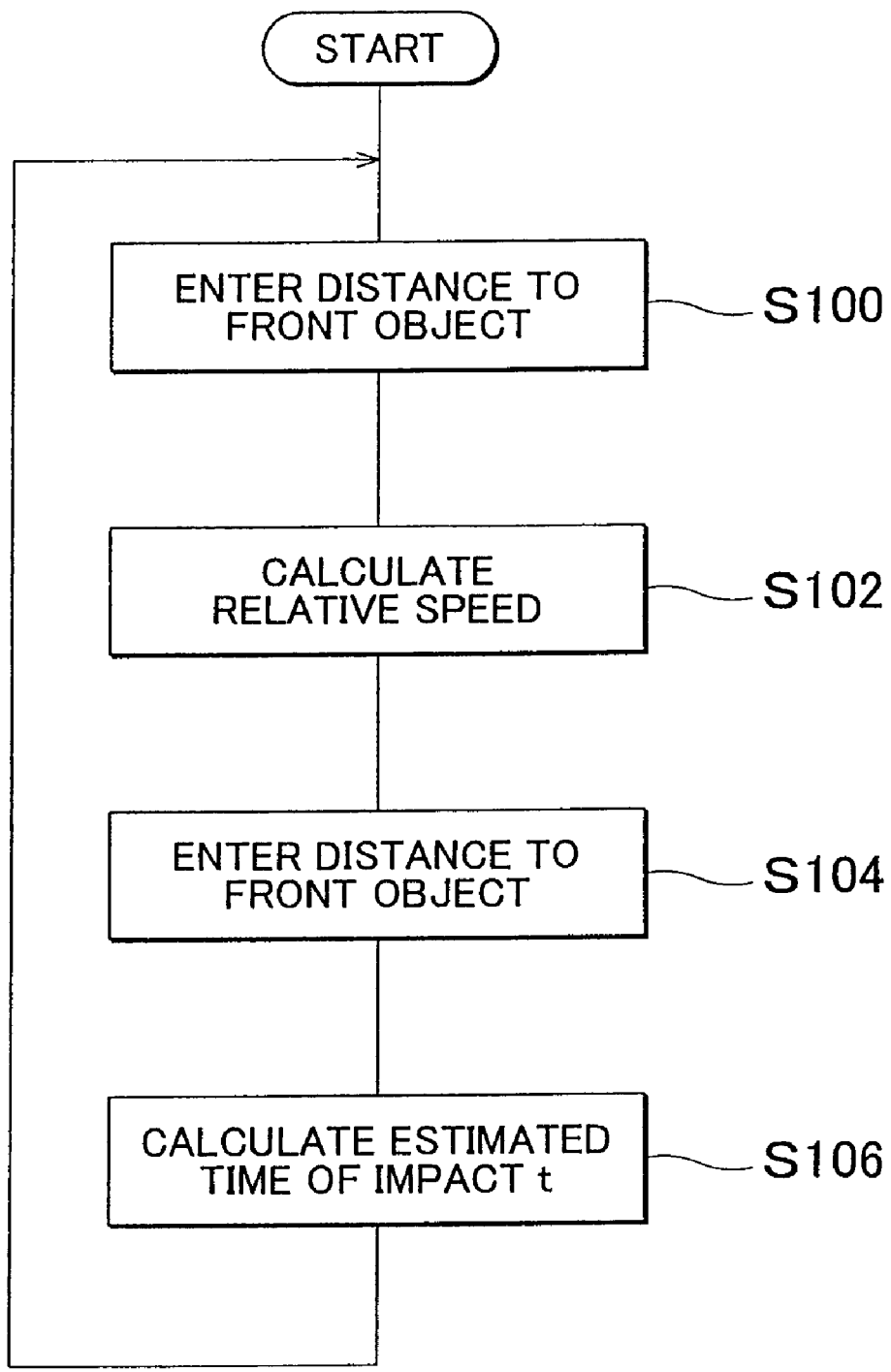
FIG. 5 is a flow chart that shows an example of the process performed in a collision determination ECU in one embodiment of the occupant protection device.

First, the process performed in the collision determination ECU 22 will be described. FIG. 5 is a flow chart that shows an example of the process that is performed in the collision determination ECU 22 of the occupant protection device 10 according to an embodiment of the present invention. The process shown in FIG. 5 is started when the ignition switch (not shown) is turned on and ended when the ignition switch is turned off or when the host vehicle collides with an object.

In step 100, the distance to an object in front of the vehicle is input, and the process proceeds to step 102. That is, in step 100, detected results of the front millimeter wave radar 12, the front lateral millimeter radar 14, the stereo camera 16, etc. are input.

In step 102, a relative speed is calculated, and the process proceeds to step 104. For example, a relative speed is calculated based on the distance to an object in the front detected per certain period of time by the millimeter wave radar. A relative speed may be calculated based on the distance obtained by image processing of the image taken with the stereo camera 16.

In step 104, a detected result of the millimeter wave radar is newly input, and the process proceeds to step 106.

In step 106, an estimated time of impact t, which is the estimated amount of time before the vehicle collides with an object, is calculated, and the process returns to step 100 and repeats the steps described to this point. That is, the estimated time of impact time t is calculated based on the distance to the object detected by the front millimeter wave radar 12, the front lateral millimeter radar 14, the stereo camera 16, etc. and based on the relative speed calculated in step 102, and then the process returns to step 100 and repeats the steps described above.

Figure 6:
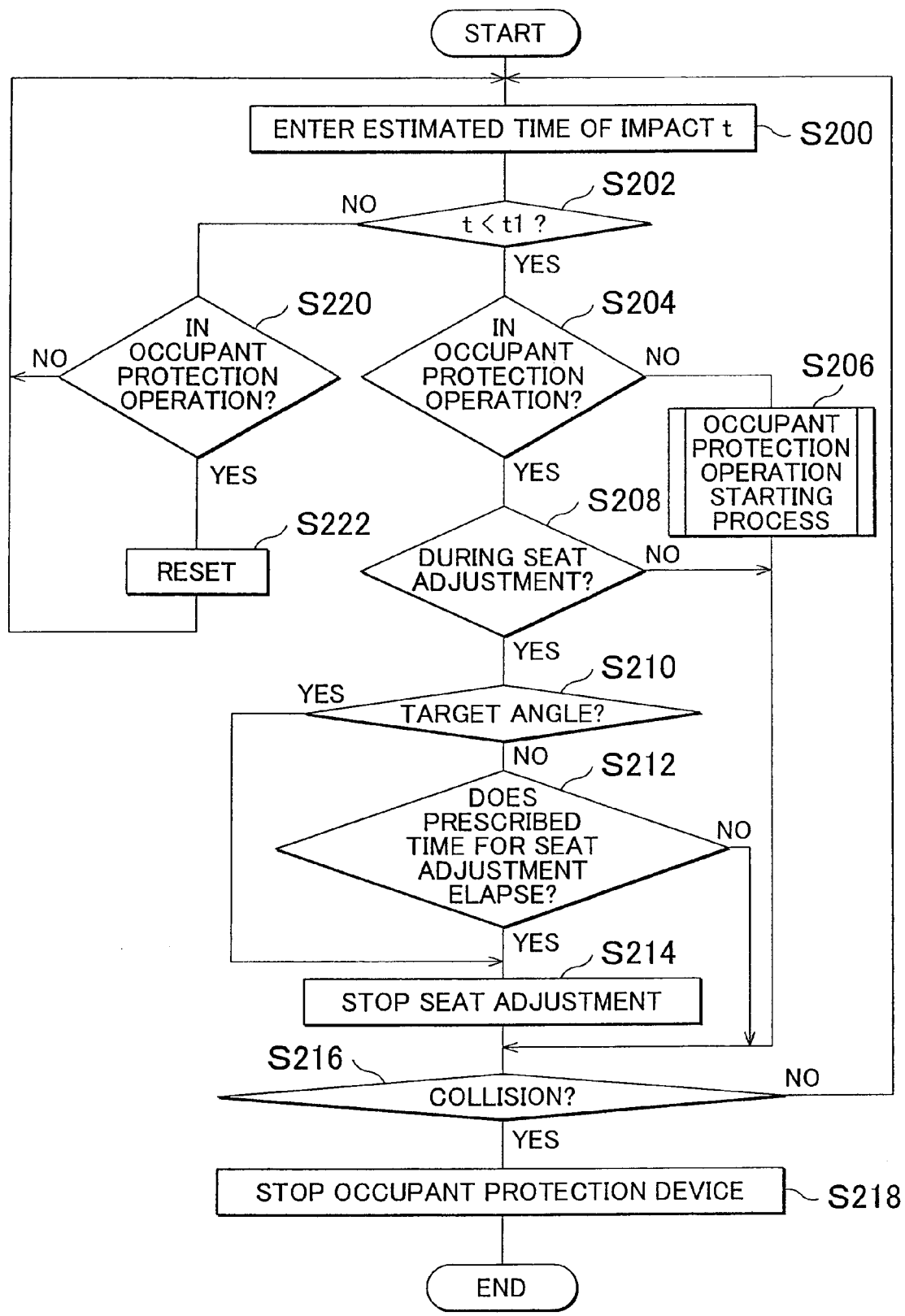
FIG. 6 is a flow chart that shows an example of the process performed in an occupant protection control ECU in one embodiment of the occupant protection device.

Next the process performed in the occupant protection control ECU 26 will be described. FIG. 6 is a flow chart that shows an example of the process performed in an occupant protection control ECU 26 of the occupant protection device according to an embodiment of the present invention. The process shown in FIG. 6 is started when the ignition switch (not shown) is turned on.

In step 200, the estimated time of impact t calculated by the collision determination ECU 22 is input, and the process proceeds to step 202.

In step 202, it is determined whether the estimated time of impact t is less than a predetermined time t1. If the determination is affirmative, the process proceeds to step 204. If the determination is negative, the process proceeds to step 220.

In step 204, it is determined whether the occupant protection operation is being performed. That is, it is determined in step 204 whether driving of the seat actuator 28 and the seatbelt motor 32 has been initiated by an occupant protection device starting process. If the determination in step 204 is negative, the process proceeds to step 206. If the determination in step 204 is affirmative, the process proceeds to step 208.

Figure 7:
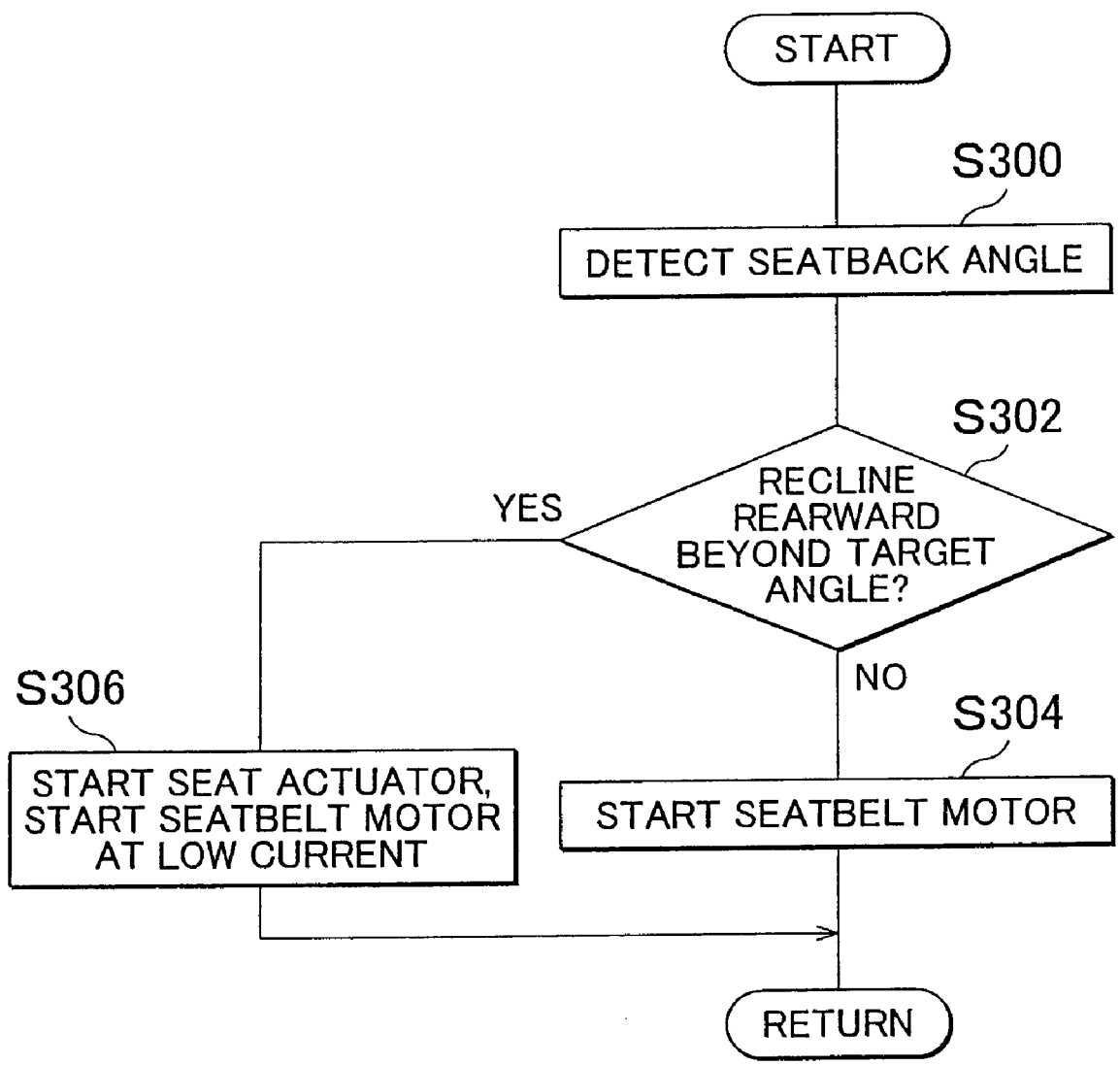
FIG. 7 is a flow chart that shows an example of occupant protection operation start process performed in the occupant protection control ECU in one embodiment of the occupant protection device.

In step 206, the occupant protection operation process is performed, and the process proceeds to step 216. Here, the occupant protection operation starting process will be described. FIG. 7 is a flow chart that shows an example of the occupant protection operation starting process that is performed in the occupant protection control ECU 26 of the occupant protection device 10 according to an embodiment of the present invention.

When the process proceeds to the occupant protection operation starting process, first in step 300, a seatback angle is detected and the process proceeds to step 302. That is, in step 300, the reclining angle of the seatback 36 detected by the seatback angle detection sensor 30 is obtained.

In step 302, it is determined whether or not the seatback 36 is reclined rearward beyond the target angle. That is, it is determined whether the detected reclining angle of seatback 36 is larger than the target angle. If the determination is negative, the process proceeds to step 304. If the determination is affirmative, the process proceeds to step 306.

In step 304, the seatbelt motor 32 is driven, and then the occupant protection operation starting process returns to the process in FIG. 6. That is, the seatbelt 38 is retracted, and the occupant is restrained.

On the other hand, in step 306, the seat actuator 28 are driven, and the seatbelt motor 32 are driven at a low electric current simultaneously, and then the occupant protection operation starting process returns to the process in FIG. 6.

That is, in the occupant protection operation starting process, the seat actuator 28 and the seatbelt motor 32 are driven at the same time. The electric current applied to the seatbelt motor 32 is changed according to whether the seatback 36 when it is determined that a collision is imminent is reclined rearward beyond the target angle (i.e., the electric current applied to the seatbelt motor 32 is changed according to whether the detected reclining angle is larger than the target angle). When the seatback 36 is being inclined forward and the retracting operation of the seatbelt 38 are performed at the same time, power consumption is reduced by decreasing the driving force of the seatbelt motor 32.

On the other hand, in step 208 of FIG. 6, it is determined whether the reclining angle of the seatback 36 is being adjusted. The step 208 determines whether the seat actuator 28 is being operated after the estimated time of impact is less than the predetermined time t1. If the determination is affirmative, the process proceeds to step 210. If the determination is negative, the process proceeds to step 216.

In step 210, it is determined whether the reclining angle of the seatback 36 is the target angle (i.e., the predetermined reclining angle). If the determination is affirmative, the process proceeds to step 212. If the determination is negative, the process proceeds to step 214.

In step 212, it is determined whether the prescribed period of time elapses since the adjustment of the seatback 36 is started. In the determination, the prescribed period of time necessary for securely preventing the seat adjustment from continuing after a collision is set, and whether the prescribed period of time elapses is determined. That is, the prescribed period of time mentioned here sets the time to stop the seat adjustment of the seatback 36 before a collision. If the determination is affirmative, the process proceeds to step 214. If the determination is negative, the process proceeds to step 216.

In step 214, adjustment of the seatback 36 is stopped, or drive of the seat actuator 28 is stopped, and then the process proceeds to step 216.

In step 216, it is determined whether a collision occurs. Step 216 determines whether a collision is detected by a collision detection sensor within the estimated time of impact. If the determination is negative, the process returns to step 200 and repeats the above steps. If the determination is affirmative, the process proceeds to step 218 where the occupant protection device 10 is stopped and the series of steps are terminated. Here, the stop of the occupant protection device 10 indicates the stop of the seat actuator 28 and the stop of the seatbelt motor 32.

In contrast, if the determination result of step 202 is negative and the process proceeds to step 220, it is determined whether the occupant protection operation is being performed. That is, step 220 determines whether the seat actuator 28 and the seatbelt motor 32 are being driven after starting of the occupant protection device starting process. If the determination is affirmative, the process proceeds to step 222. If the determination is negative, the process returns to step 200 and repeats the above steps.

In step 222, the seat actuator 28 and the seatbelt motor 32 that are being driven are reset and stopped, and then the process returns to step 200 and repeats the above steps. When the seat actuator 28 is being driven, the seat actuator 28 may be driven so as to return the reclining angle of the seatback 36 to the reclining angle of the seatback before the driving of the seat actuator began (initial reclining angle).

As described above, if it is determined that a collision is imminent (when the estimated time of impact becomes less than the predetermined time t1) the occupant protection device 10 according to the embodiment of the present invention adjusts the reclining angle of the seatback 36 to the target angle, and adjusts the position of the occupant to the suitable state. Therefore, occupant protection may suitably be performed by the seatbelt 38 and an air bag and the like. At the same time, the protection of the occupant may be secured by retracting the seatbelt 38 and restraining the occupant.

If it is determined that a collision will occur, the occupant protection device 10 reduces the electric current supplied to the seatbelt motor 32 to be lower than the electric current supplied to the seatbelt motor 32 when the seatback 36 is the target angle and the seatbelt motor 32 alone is driven. Thus, the inclination of the seatback 36 and the retracting operation of the seatbelt 38 can suitably be operated, and the power consumption is suppressed.

Next, a modification of the occupant protection device according to the embodiment of the present invention will be described.

In the above embodiment, when it is determined that a collision is imminent, the occupant protection device 10 reduces the electric current supplied to the seatbelt motor 32 to be lower than the electric current supplied to the seatbelt motor 32 when the seatback 36 is the target angle and the seatbelt motor 32 alone is driven. However, in the modified embodiment, when the seatback 36 is reclined vehicle rearward beyond the threshold reclining angle, retraction of the seatbelt 38 is prohibited in order to maintain a sufficient amount of electric power to drive the seat actuator 28 for seatback 36. The difference between these embodiments lies in the starting process of the occupant protection operation, and thus only the difference will be described.

FIG. 8 is a flow chart that shows a modification of the occupant protection operation start process performed in the occupant protection control ECU of the occupant protection device according to an embodiment of the present invention. The same processes as in FIG. 7 are denoted by the same symbols.

When the process proceeds to the occupant protection operation starting process, first in step 300, a seatback angle is detected and the process proceeds to step 302. That is, in step 300, a reclining angle of the seatback 36 detected by the seatback angle detection sensor 30 is obtained.

In step 302, it is determined whether the seatback 36 is reclined rearward beyond the target angle. That is, it is determined whether the detected reclining angle of seatback 36 exceeds the target angle. If the determination is negative, the process proceeds to step 304. If the determination is affirmative, the process proceeds to step 305.

In step 304, the seatbelt motor 32 is driven, and then the occupant protection operation starting process returns to the process in FIG. 6. That is, the seatbelt 38 is retracted, and the occupant is restrained.

In step 305, it is determined whether the detected reclining angle of the seatback 36 exceeds the threshold angle (threshold reclining angle). If the determination is negative, the process proceeds to step 306. If the determination is affirmative, the process proceeds to step 308.

In step 306, the seat actuator 28 are driven, and the seatbelt motor 32 are driven at a low electric current, and then the occupant protection operation starting process returns to the process in FIG. 6.

In step 308, the seat actuator 28 alone is driven, and then the occupant protection operation starting process returns to the process in FIG. 6. That is, only adjustment of the seatback reclining angle is permitted and only the seatback reclining angle is adjusted with the retraction of the seatbelt 38 prohibited.

In the same way as the preceding embodiment described above, in the modification of the occupant protection operation starting process, if it is determined that a collision is imminent, the occupant protection device 10 reduces the electric current supplied to the seatbelt motor 32 to be lower than the electric current supplied to the seatbelt motor 32 when the seatback 36 is the target angle and the seatbelt motor 32 alone is driven. Thus, the inclination of the seatback 36 and the retracting operation of the seatbelt 38 can suitably be operated, and the power consumption is suppressed.

In the modified embodiment, when the seatback 36 is tilted beyond the threshold angle, that is when the seatback is reclined at an extreme angle, the seatback 36 alone is driven while the retraction of the seatbelt 38 is prohibited. Thus, the electric power necessary for driving the seatback 36 can be maintained sufficiently. While only the seatback actuator 28 from among the seatbelt motor 32 and the seatback actuator 28 is driven so as to decrease the reclining angle of the seatback 36 (i.e., while the retraction of the seatbelt 38 is prohibited in step 308), if it is determined that the estimated time of impact t is less than a predetermined time t2 that is smaller than the predetermined time t1 of step 202 (i.e., when the collision is very imminent), the occupant protection control ECU 26 may control to stop the seatback actuator 28 and to permit the retraction of the seat belt 38 so that the seatbelt motor 32 starts the retraction of the seatbelt 38. It is preferable that the seatback 36 is inclined frontward even a little when the rear collision is imminent. However, if it is determined that the frontward inclination of the seatback 36 occurs no effect when the frontal collision is imminent, the inclination of the seatback 36 may be completely prohibited.

In the embodiment described above, the seat actuator 28 is driven to incline the seatback 36 only when the reclining angle of the seatback 36 exceeds the target angle (when the seatback 36 is reclined vehicle rearward beyond the target angle) and it is determined that a collision is imminent. However, the present invention is not limited to this. For example, the seat actuator 28 may be driven to recline the seatback 36 toward the rear of the vehicle when the reclining angle of the seatback 36 is below the target angle (when the seatback is inclined beyond the target angle). In this case, the seatback 36 moves in the direction in which restraining force of the seatbelt 38 decreases. Hence the restraining force of the seatbelt 38 may be increased by increasing the driving force of the seatbelt motor 32 by, for example, increasing the electric current supplied to the seatbelt motor 32 above the amount of electric current supplied when the reclining angle of the seatback 36 is the target angle and the seat actuator 28 need not be driven (or larger than the electric current that is supplied when the reclining angle of the seatback 36 is larger than the target angle and the seat actuator 28 is driven to incline the seatback 36). The seatback is easily reclined rearward due to the occupant's weight applied thereon. Hence when the seatback 36 is reclined rearward, the driving force of the seat actuator 28 may be set lower than the driving force that is applied when the seatback 36 is inclined forward in order to reduce power consumption.

In the above embodiment, the case where the seatbelt motor 32 is stopped when the seatbelt 38 is retracted by the seatbelt motor 32 after predicting of the collision has not been specifically described. However, the seatbelt motor 32 may stop if the load of retracting the seatbelt 38 reaches a predetermined level, or may be stopped if the estimated time to collision passes or when the collision occurs, or may be stopped when a prescribed period of time elapses since the time the seatbelt motor 32 began operation.

In the above embodiment, monitoring of the front and rear is performed by the front millimeter wave radar 12, the front lateral millimeter wave radar 14, the stereo camera 16, the rear millimeter wave radar 18, and the rear lateral millimeter wave radar 20. However, the present invention is not limited to this. The monitoring may be performed by a detection part such as a radar that monitors the side of the vehicle. The occupant protection control ECU 26 may change the reclining angle of the seatback 36 based on the collision configuration.

The present invention is not limited to any of the above embodiments, and the above embodiments may be modified within the scope of the present invention.

The invention claimed is:

1. An occupant protection device comprising:
a collision prediction part that predicts whether a collision will occur for a host vehicle;
a seatback actuator that adjusts a reclining angle of a seatback that is defined as an angle between the seatback and a seat cushion;
a seatbelt retracting part that exerts a driving force to retract a seatbelt to restrain the occupant;
a reclining angle sensor that detects the seatback reclining angle; and
a controller that controls the seatback actuator so that the reclining angle becomes a target reclining angle and that controls the seatbelt retracting part to retract the seatbelt if the collision prediction part determines that the collision will occur, wherein
the controller executes a control, so that the driving force of the seatbelt retracting part when the reclining angle of the seatback is decreased is smaller than at least one of the driving force of the seatbelt retracting part in retracting the seatbelt when the reclining angle of the seatback is not changed and the driving force of the seatbelt retracting part when the reclining angle of the seatback is increased.

2. The occupant protection device according to claim 1, wherein the seatbelt retracting part includes a motor, and the controller reduces the driving force of the seatbelt retracting part by reducing an electric current supplied to the motor.

3. The occupant protection device according to claim 1, wherein the controller prohibits the seatbelt retracting part from retracting the seatbelt if the seatback reclining angle is equal to or exceeds a threshold reclining angle.

4. The occupant protection device according to claim 1, wherein the controller determines whether the seatback reclining angle detected by the reclining angle sensor is the target reclining angle.

5. The occupant protection device according to claim 4, wherein the controller drives the seatback actuator to decrease the reclining angle of the seatback if the controller determines that the detected reclining angle of the seatback exceeds the target reclining angle.

6. The occupant protection device according to claim 4, wherein the controller drives only the seatbelt retracting part from among the seatback actuator and the seatbelt retracting part if the controller determines that the detected reclining angle of the seatback is the target reclining angle.

7. The occupant protection device according to claim 1, wherein if the collision prediction part determines that the collision will occur and the seatback actuator is controlled by the controller to adjust the seatback reclining angle to become the target reclining angle, the controller determines whether a prescribed period of time has elapsed after the control of the seatback is started; if the controller determines that the prescribed period of time has elapsed, the controller stops driving the seatback actuator.

8. The occupant protection device according to claim 1, further comprising:
 a collision detection sensor, wherein:
  the collision prediction part calculates an estimated time of impact which is an estimated amount of time before the host vehicle will collide with an object; and
  after the collision prediction part predicts that a collision will occur and the controller controls the seatback actuator to adjust the reclining angle to become the target reclining angle from an initial reclining angle, if the collision detection sensor does not detect a collision by the estimated time of impact, the controller controls the seatback actuator to stop the seatback actuator or to return the seatback to the initial reclining angle.

9. The occupant protection device according to claim 1, wherein the controller executes a control, so that the driving force of the seatbelt retracting part when the reclining angle of the seatback is increased is larger than at least one of the driving force of the seatbelt retracting part in retracting the seatbelt when the reclining angle of the seatback is not changed and the driving force of the seatbelt retracting part when the reclining angle of the seatback is decreased.

10. The occupant protection device according to claim 9, wherein the driving force of the seatback actuator when the reclining angle of the seatback is increased is set smaller than the driving force of the seatback actuator when the reclining angle of the seatback is decreased.

* * * * *